United States Patent [19]

Stamberger

[11] 3,898,703
[45] Aug. 12, 1975

[54] METHOD AND MEANS FOR INCREASING THE AIR PRESSURE WITHIN SELF-INFLATED HOLLOW BODIES FOR USE AS CUSHIONS AND FOR LIKE PURPOSES

[76] Inventor: Paul Stamberger, 552 W. University Parkway, Baltimore, Md. 21210

[22] Filed: Jan. 3, 1974

[21] Appl. No.: 430,555

Related U.S. Application Data

[60] Division of Ser. No. 228,223, Feb. 22, 1972, Pat. No. 3,829,918, which is a continuation-in-part of Ser. No. 76,734, Sept. 30, 1970, Pat. No. 3,643,268, which is a continuation-in-part of Ser. No. 738,657, June 20, 1968, Pat. No. 3,553,113, which is a continuation-in-part of Ser. No. 453,252, May 5, 1968, abandoned.

[52] U.S. Cl. .................................. 5/348 R; 5/349
[51] Int. Cl.² ......................................... A47C 27/08
[58] Field of Search...... 206/522, DIG. 30; 5/348 R, 5/349, 350

[56] References Cited
UNITED STATES PATENTS
2,812,525  11/1957  Friedlander......................... 5/348 R Primary Examiner—Paul R. Gilliam
Assistant Examiner—Andrew M. Calvert

[57] ABSTRACT

The method described and claimed herein provides an effective and highly efficient method whereby the air pressure within a previously inflated, self-inflated, box-like body of the general type disclosed in my aforesaid patent may be readily increased above the pressure normally existing within the self-inflated body following the normal inflation thereof. The method of the present invention may be briefly and accurately described by stating that said method includes the steps of moving one or more stiff portions provided between the top and bottom of a self-inflated box-like structure from a substantially vertical position to a substantially horizontal position for a single time or for a successive series of times, which successive series of times may be termed a "pumping action," these steps being performed after said box-like body has been self-inflated so that additional compressed air is forced from beneath said stiff member or members and into the remaining portion of the self-inflated box-like body to increase the air pressure within said remaining portion, following which said stiff member or members is or are retained in its or their horizontal position or positions by clamps or other securing means. Suitable air inlet, air outlet or check valves are provided which function in accordance with the method of the present application.

6 Claims, 11 Drawing Figures

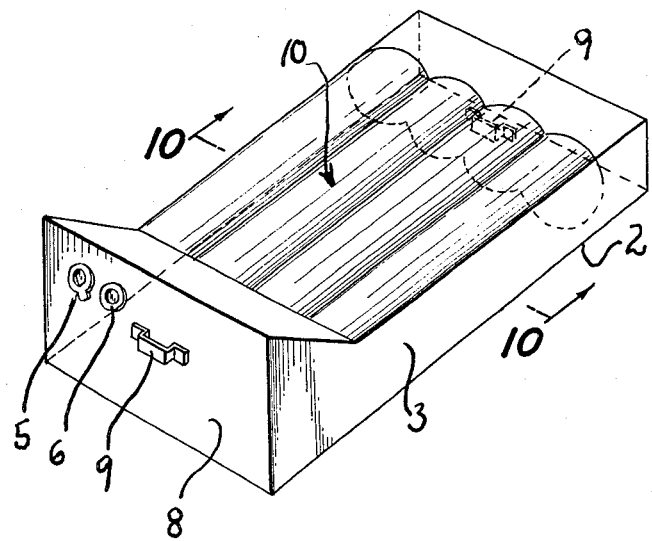
Fig. 7
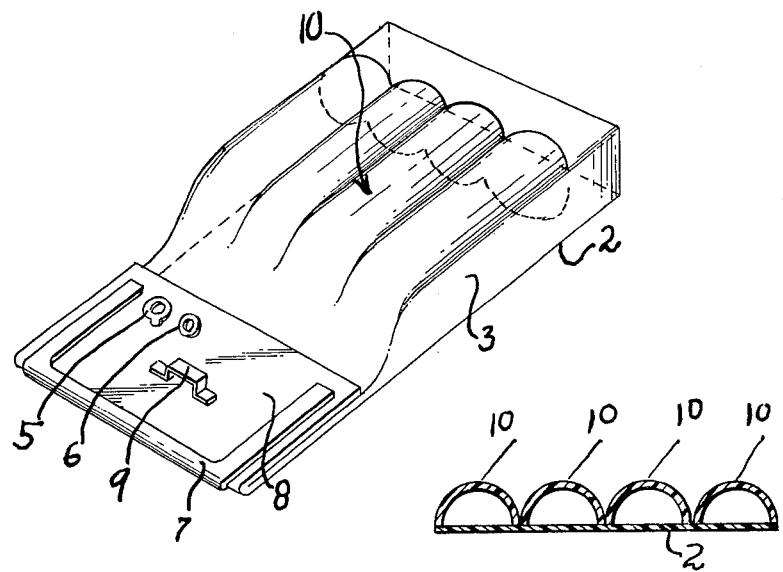
Fig. 8
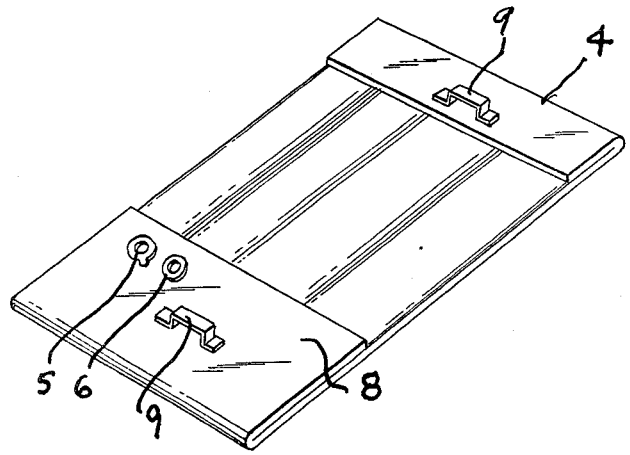
Fig. 9
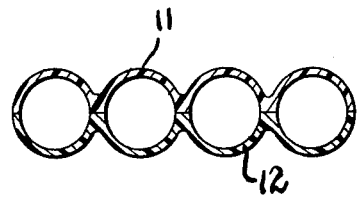
Fig. 10
Fig. 11

METHOD AND MEANS FOR INCREASING THE AIR PRESSURE WITHIN SELF-INFLATED HOLLOW BODIES FOR USE AS CUSHIONS AND FOR LIKE PURPOSES

PRIOR APPLICATIONS

The present application is a divisional application of my previously-filed application Ser. No. 228,223 filed Feb. 22, 1972 which has now matured into U.S. Pat. No. 3,829,918 of Aug. 20, 1974, which application Ser. No. 228,223 is a continuation-in-part of my previously-filed application Ser. No. 76,734 filed Sept. 30, 1970 and which has now matured into U.S. Pat. No. 3,643,268 of Feb. 22, 1972, which application Ser. No. 76,734 is a continuation-in-part of my application Ser. No. 738,657 filed June 20, 1968 and which has now matured into U.S. Pat. No. 3,553,113 of Oct. 13, 1970, which application Ser. No. 738,657 is a continuation-in-part of my application Ser. No. 453,252 filed May 5, 1968 which has now become and stands abandoned.

THE OBJECTS OF THE INVENTION

It is an object of my present invention to provide by my improved method, a self-inflatable, box-like, air-impervious body of square, rectangular, circular, elliptical, or polygonal configuration in plan, and which may be generally similar in construction and operation to the several forms of my invention disclosed and claimed in my several applications and patents referred to under the above caption of PRIOR APPLICATIONS, and in particular those in which one or more of the stiff members which extend between the edges of the top and bottom portions of the box like body may be moved manually after the self-inflation of the box like body has been effected and the air inlet valve has been closed to maintain the air pressure within said box like body, from a substantially vertical position to a substantially horizontal position to force the volume of air in said box like body adjacent said stiff member into the main supporting portion of the box like body to increase the air pressure within said portion and to change the shape thereof, following which said stiff member is clamped or otherwise retained in said horizontal position.

It is a further object of my present invention to provide by my improved method, a self-inflatable, boxlike body of the type referred to above, which instead of being provided with a single air inlet and outlet valve, is provided with a second valve in the form of a one-way check valve which permits air to be drawn therethrough and into the box like body but prevents air from being exhausted therethrough. Instead of employing a separate check valve in addition to the air inlet and outlet valve, I may employ a combined air inlet, air outlet and one-way check valve in which that part of the valve which normally functions as a one-way check valve may be manually operated to render it inoperative to perform its normal one-way function and to permit the air from within the box like body to escape therethrough as the box like body is collapsed or deflated. Regardless of whether a separate check valve is employed in addition to the air inlet and outlet valve, or whether a combined air inlet, air outlet and one-way check valve is employed, the arrangement permits one or more of the sitff members to be moved repeatedly from the vertical to the horizontal position to effect what might be termed a "pumping" action to increase the air pressure within the box-like body to the desired degree. This pumping action is effected when the air inlet valve has been closed and the separate one-way check valve performs its normal function of permitting air to be drawn into the box-like body but prevents air being exhausted therefrom. When the single combined air inlet, air outlet and one-way check valve is employed, said combined valve structure will admit air into the box-like body through the air inlet valve portion and through the one-way check valve portion and into the box-like body and the closed outlet valve portion and one-way check valve portion will retain the air therein and will permit the pumping action referred to above. After the pumping action has been repeated and the desired air pressure has been built up within the box-like body, the said stiff portion by which the repeated pumping action has been effected, may be permitted to remain in its normal vertical position or may be moved to a horizontal position to further increase the air pressure within the supporting portion of the hollow body and be clamped or otherwise retained in its substantially horizontal position.

It is a further object of my present invention to provide within the box-like body a series of resilient, flexible, and air-impervious tube-like members extending in longitudinal, closely adjacent relation to each other and of circular or semicircular transverse cross section, and which tube-like members are open at both ends thereof and are inflated during the act of inflating the box-like body, which tube-like members when inflated force the top portion of the box-like body into a series of longitudinally-extending ridges or corrugations constituting the top supporting surface of the box-like body in instances where tubes of semi-circular transverse cross section are employed, and constituting the top and bottom surfaces of the cushion, pillow, mattress or the like when tubes of circular transverse cross section are employed. Instead of providing a series of separate tube-like members within the box-like body, it is within the scope of the present invention to form the tube-like members by connecting the top and bottom portions together by spaced, longitudinally-extending seams of stitching or adhesive material and bulging the material of the top and bottom portions upwardly and downwardly, respectively, between said seams to form a series of ridges or corrugations open at their ends and in communication with a hollow, enclosed, airtight chamber at each end of the tube-like ridges or corrugations, the construction being such that when the stiff member or members at the end or ends of the enclosed chambers at each end of each tube-like surfaces thus formed are self inflated when said stiff member or members are moved from a vertical to a horizontal position to self-inflate said tube-like members to provide the desired ridged or corrugated top and bottom surfaces of the cushion, pillow, mattress or the like.

It is a still further object of my present invention to provide a method which may be applied to self-inflatable, box-like bodies admirably suited for use as cushions, pillows, mattresses or like articles, which bodies are relatively cheap and easy to manufacture, which may be moved manually or automatically with a minimum of effort from a normal, collapsed and/or folded condition to a self-inflated condition, and to provide a method whereby the air pressure within said box-like bodies may be increased to the desired degree, and to provide such a cushion, pillow, mattress or like article of manufacture which is highly efficient and practical in the purposes for which designed.

THE PRIOR ART

Searches were made through the pertinent prior art by a competent searcher prior to the filing of the present application, and no references were located relating to the same or substantially the same method presented herein which would appear to negative the novelty, in a patentable sense of the method presented herein for increasing the air pressure to the desired degree within a box-like cushion, pillow, mattress or the like, regardless of whether the method is employed in connection with self-inflated or otherwise inflated articles of the general type specified herein. The only prior art with which applicant and/or his attorneys are aware are those patents called to applicant's attention during the prosecution of applicant's prior patents and applications above under the caption of PRIOR APPLICATIONS.

THE ACCOMPANYING DRAWINGS

In the accompanying drawings wherein for the purpose of illustration I have shown several preferred embodiments of the present invention to which the method of the present divisional application may be applied:

FIGS. 1 and 2 are perspective views illustrating one form of box-like structure in which a single stiff member is provided at one end of a hollow, box-like air-inflated body, these Figures showing the provision of an air inlet and outlet valve for the admission and exhaust of air to and from the interior of said hollow, box-like body, and also the provision of a separate one-way check valve which permits air to be drawn into said hollow, box-like body but prevents the escape of air therefrom, FIG. 2 showing the substantially horizontal position of the stiff member at one end of said body after it has performed its function of increasing the air pressure within the hollow body and changing the shape thereof, and is clamped in said horizontal position;

FIG. 3 is a perspective view similar to the showing of FIG. 2 and illustrating the clamped position of a stiff member at each end of the hollow, box-like body;

FIGS. 4 and 5 are perspective views illustrating a modified form of the hollow, box-like body to which the method of the present divisional application is applicable and; wherein the height of the stiff member at one end of the hollow body has been increased in excess of the height of the interconnecting member between the marginal edges of the top and bottom portions, with the height of those portions of said interconnecting member adjacent the ends of the stiff member of increased height also being increased to provide an airtight, hollow body, FIG. 5 showing said stiff member of increased height when in its clamped horizontal position after it has performed its intended function;

FIG. 6 is a perspective view showing the form of the hollow box-like body illustrated in FIGS. 4 and 5 when the hollow, box-like body is in its collapsed, deflated, inoperative condition with the stiff members at the ends thereof overlying adjacent portions of the top portion of said body when said body is ready to be folded longitudinally for storage or shipping purposes;

FIGS. 7 and 8 are perspective views of a modified form of the box-like body shown in FIGS. 4 and 5 and showing the provision of a series of longitudinally-extending, open-ended, closely adjacent tubes of semi-cylindrical transverse cross section disposed within the box-like body, each of which tubes has its longitudinally-extending edges adhesively secured to the flat bottom portion of said body, and which tubes are inflated when the box-like body which contains them is inflated, inflation of said tubes causing the top, supporting surface of said body to be expanded into a series of ridges or corrugations, each of said tubes terminating in spaced relation with respect to the end portions of the said body and being in communication with each other to equalize the pressure existing therein;

FIG. 9 is a perspective view showing the form of the box-like body illustrated in FIGS. 7 and 8 when the box-like body has been collapsed and deflated, and when the stiff members at the ends thereof are overlying the top portion of said body when said body and the tubes therein are ready to be folded longitudinally for storing or shipping purposes;

FIG. 10 is a transverse sectional view on the line 10—10 of FIG. 7; and

FIG. 11 is a transverse sectional view of a form of tubes which may be placed within the box-like body in the same manner as the semi-cylindrical tubes of FIGS. 7, 8 and 9, but differing therefrom in that the tubes illustrated in FIG. 11 are of circular transverse cross section which may be regular one piece tubes, or which may be formed by adhesively securing the longitudinally-extending edges of the superimposed tube sections of semicircular transverse cross section one above the other.

DETAILED DESCRIPTION OF THE APPARATUS

Figure 1:
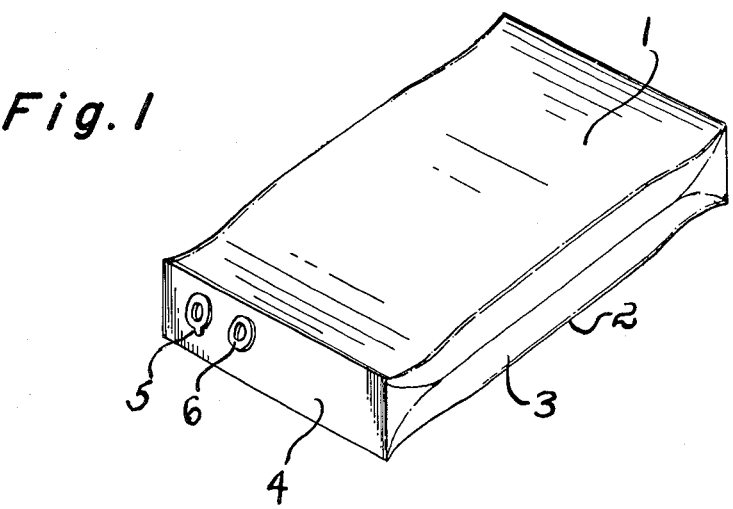
Figure 2:
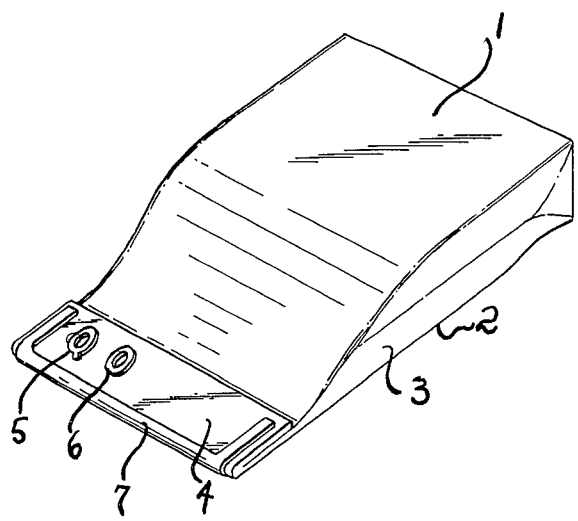

Referring more in detail to the construction of the self-inflatable hollow body illustrated in FIGS. 1 and 2 of the accompanying drawings, the top portion 1 and bottom portion 2 are composed of relatively strong, flexible, air-impervious sheet material, and are of the same relative size and configuration. Said top and bottom portions are interconnected in airtight relation along their marginal edges by a member 3 of relatively strong, flexible, air-impervious material preferably of bellows-like construction, which member is of a sufficient height to form a hollow, box-like body of the desired height when said body has been inflated to serve as a cushion, pillow, mattress or the like. In the form of the present invention shown in FIGS. 1 and 2 the portion of the interconnecting member 3 at one end of the hollow, box-like body is stiffened or a separate stiff member 4 is provided which has the upper and lower edges thereof attached to the adjacent edges of the top and bottom portions 1 and 2 respectively, which stiffened or stiff member 4 has mounted thereon and passing therethrough and through the adjacent end portion of the interconnecting member 3, an air inlet and air outlet valve 5 which, when open permits air to be drawn into the hollow, box-like body and when closed retains the air within said hollow body until it is again opened to permit air to escape therethrough when said hollow body is being collapsed or deflated.

In all forms of the invention shown in FIGS. 1 through 9 of the accompanying drawings I have shown a separate, independent one-way check valve 6 which passes through the stiff member 4 and through the adjacent end portion of the interconnecting member 3, which valve 6 functions without manual manipulation to permit air to be drawn into the hollow body but prevents air from escaping therefrom, but it is to be understood that this showing of two separate and independent valves 5 and 6 is for illustrative purposes only, and that the air inlet, air outlet and one-way check valve may be incorporated in a single valve structure in which the one-way check valve operation may be rendered ineffective by manual manipulation to permit the air within the hollow, box-like body to pass outwardly through the single combined valve structure when said body is being collapsed or deflated. It is also to be understood that a stiffened portion or a stiff member may be provided at both ends of the hollow, box-like body as clearly shown in FIG. 3, in which construction it is only necessary to provide valves 5 and 6 or the above mentioned single combined valve structure in one of the said stiffened or stiff members 4.

As a means for retaining the stiffened or stiff member or members 4 in the position shown in FIGS. 2, 3, 5 and 8 of the accompanying drawings, in instances where such retention is desired and after said member has performed its intended function as a means for increasing the air pressure within the hollow body, means are provided for such retention. One form of clamp which has been found to be suitable for this purpose is made from a piece of relatively strong metal cut in the shape of the letter H which is bent over to form a U-shaped clamp 7 in which the end portions thereof are disposed in parallel, spaced relation and are separated or spaced apart a distance slightly less than the combined thickness of bottom portion 2 and the thickness of stiff member 4, so that when said clamp 7 is applied as shown in FIGS. 2, 3, 5 and 8, said stiff portion 4 is retained in fixed, parallel relation with respect to the underlying portions of top and bottom portions 1 and 2 of the hollow, box-like body due to the resilient action of said clamp. It will be obvious that other forms of clamps or suitable retaining means may be employed for this purpose.

Figure 4:
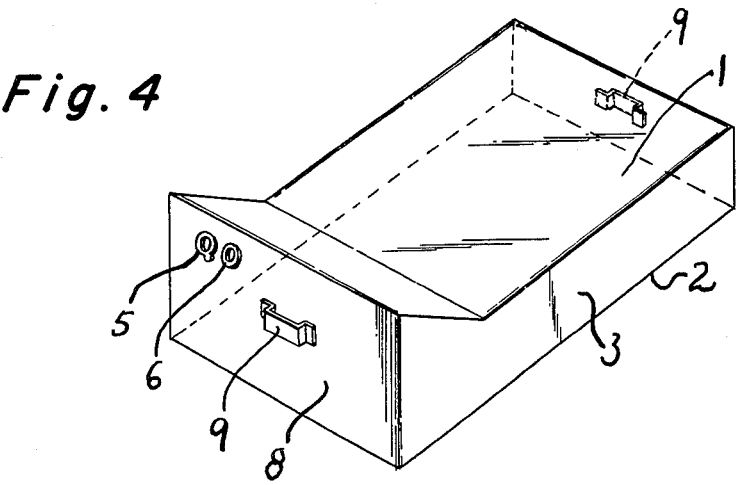
Figure 5:
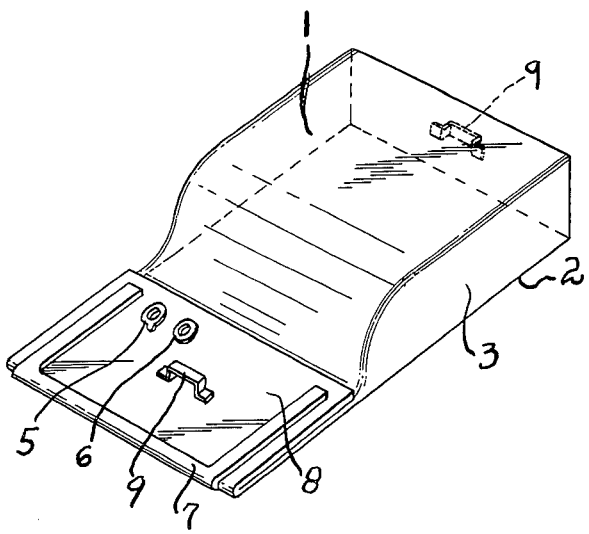
Figure 6:
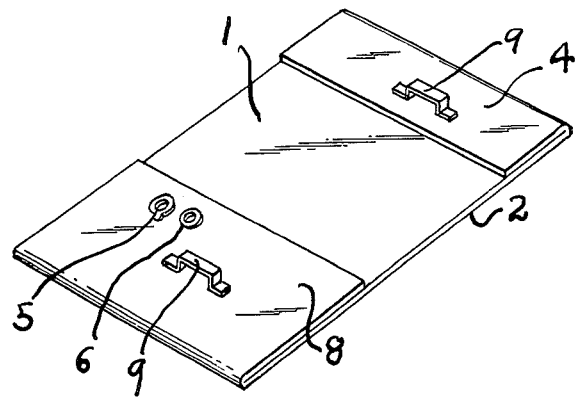

In the form of the invention shown in FIGS. 4, 5 and 6 of the accompanying drawings, I have shown a construction in which the stiff member 4 of the form of the invention shown in FIGS. 1 and 2 has been increased in height in excess of the height of the remaining portion of the interconnecting member 3 constituting the sides and end portions of the hollow, box-like body, that portion of said interconnecting member 3 adjacent the ends of said member 4 of increased height being correspondingly increased in height. The stiff member of increased height designated in FIGS. 4 through 7 of the accompanying drawings by the reference numeral 8 serves effectively as a means for increasing the air pressure within the hollow, box-like body when said member 8 is operated in accordance with the method presented divisional in the present application and to be described hereinafter. In this form of the present invention, and in any of the other forms thereof, especially when the hollow, box-like body is of relatively large size, handles 9 may be provided which may be grasped by the operator when the end members are being pulled apart during the procedure of self-inflating the hollow, box-like body.

In the form of the invention shown in FIGS. 7, 8 and 9, I form within the box-like body a series of resilient, flexible and air-impervious tube-like members 10 extending in longitudinal, closely-adjacent relation to each other and of semi-circular transverse cross section, which tube members are open at their ends and are inflated during the act of inflating the box-like body, which tube-like members when inflated, force the upper portion 1 of the box-like body into a series of longitudinally-extending ridges or corrugations constituting the upper supporting surface of the body. The said tube-like members 10 may be formed in the manner best shown in FIG. 10 of the accompanying drawings wherein the said members are of semi-circular transverse cross section and have their longitudinally-extending edges adhesively secured to the bottom portion 2 of the box-like body. When said tube-like members 10 are inflated, they not only form a series of longitudinally-extending ridges along the top portion 1 of the body but also tend to form a similar series of ridges or corrugations along the bottom portion 2 as indicated in dotted lines in FIGS. 7 and 8 of the accompanying drawings, which ridges or corrugations along the bottom portion are flattened out when the body is placed on a flat surface and a load is applied to the top surface of the body. If desired, the series of longitudinal tubes may be formed from regular tubes of circular transverse cross section, or may be formed as shown in FIG. 11 of the accompanying drawings, wherein said tube-like members are formed by superimposing two sections 11 and 12 of semi-circular transverse cross section one upon the other and adhesively securing the longitudinal edges of said sections. It is within the concept and scope of the present invention to provide a self-inflated cushion, pillow, mattress and the like devoid of the top and bottom portions 1 and 2 described and shown in the drawings of this divisional application, and composed of two sheets of relatively strong, flexible and air-impervious material provided with a longitudinally-extending series of spaced, parallel seams formed by stitching or formed by strips of adhesive and by bulging the material between said seams to form a series of ridges open at their ends and in communication with an enclosed, airtight chamber at each end of the said tube-like ridges or corrugations, this construction including a stiff member such as members 4 or 8 on one of said hollow, box-like, airtight chambers, which members 4 or 8 are provided with an air inlet and air outlet valve, with a separate and independent one-way check valve, or with a combined single valve structure of the type described above. FIG. 9 of the accompanying drawing shows such a construction consisting of a series of tubes or tube-like members, when collapsed or deflated and in condition for storage or shipping.

DETAILED DESCRIPTION OF THE METHOD

Figure 3:
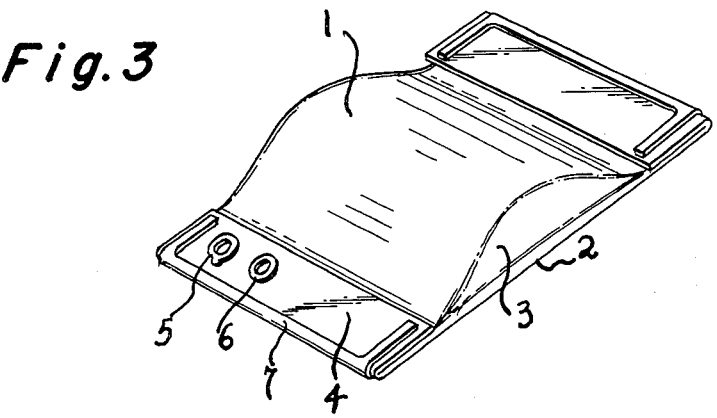

Referring to the method of the present divisional application for increasing the air pressure within a box-like body which has been inflated by a pump or other source of air pressure, or is of self-inflatable construction, and which comprises a top portion 1, a bottom portion 2, an interconnecting portion 3, and a stiff member 4 or 8 which is provided with an air inlet and outlet valve 3, it is only necessary to move the stiff member 4 and 8 from a vertical position to a horizontal position to increase the air pressure within the body by forcing the air adjacent said stiff member 4 or 8 into the remaining portion of the box-like body, following which said member 4 and 8 is clamped or otherwise retained in the position shown in FIGS. 1, 2, 3, 5 and 8 of the accompanying drawings, in FIG. 3 of which drawings there is shown a construction provided with two stiff members 4 both of which have performed their intended purpose and are clamped in a horizontal position. In situations in which it is desired to effect a pumping action by repeating the movement of stiff member 4 or 8, a separate independent one-way check valve 6 is provided in addition to valve 5, which upon the repeated movements of said stiff member 4 or 8 permits air to be drawn into said hollow, box-like body but prevents air from escaping therefrom. As stated above, a single, combined air inlet, air outlet and one-way check valve in which the said check valve may be manually manipulated to permit air to pass therethrough from the interior of said body when the same is being collapsed or deflated, may be substituted for the two independent valves 5 and 6. After the pumping action effected by repeated movements of the stiff member 4 or 8 has been completed, said members may be left at their vertical positions, or if still greater air pressure is required within the box-like body, may be moved to a horizontal position and clamped or otherwise retained therein.

When carrying out the method of the present invention as applied to the forms of the inflated bodies described and illustrated in FIGS. 7 through 11 and described in detail above, or as applied to the form of the invention wherein the top or the top and bottom portions consist of preformed tubes or tube-like members made from sections of semi-circular or circular transverse cross section, the method of operation to increase the air pressure within said tubes or tube-like members, whether disposed within said body or constituting the desired longitudinally ridged or corrugated top and/or bottom portions without being enclosed within the box-like body, is the same as that described above, i.e., the stiff portion is moved once from its vertical position to its horizontal position and then clamped or otherwise retained in said horizontal position, or when a greater degree of air pressure is desired within the tubes or tube-like members, the pumping action is accomplished, following which said stiff member may be left in its vertical position or may be clamped or otherwise retained in its horizontal position.

It is to be understood that various changes may be made in the steps of the method of the present divisional application and in the construction and operation of the box-like bodies of the various types illustrated and described and referred to herein, without departing from the spirit of the present invention which is directed broadly to a method for increasing the air pressure within an air inflated cushion, pillow, mattress or the like, or without departing from the scope of the subjoined claims, keeping in mind that the present invention is not restricted to instances in which the box-like body is self-inflated but is equally applicable to instances where such a body has been previously inflated by a pump or other source of air pressure, and that the method described and claimed in the present divisional application is applicable to the manufacture and operation of cushions, pillows, mattresses and the like where the flat top portion 1 and bottom portion 2 or the top portion 1 only is omitted and said top or top and bottom portions are formed from a series of longitudinally-extending, closely-adjacent tubes or tube-like members. It is also within the concept and scope of the method of the present divisional application that the air-impervious, box-like body may be placed within and/or covered with fabric of any desired color or design, or may of itself be made of air-impervious, flexible, relatively strong material of any desired color or design in cases where an ornamental or decorative effect is desired.

Having thus described my invention, I claim:

1. A method for increasing the air pressure within an air-inflated, box-like, air-impervious body comprising a top portion and a bottom portion of substantially the same size and configuration connected along their marginal edges in airtight relation by a flexible air-impervious interconnecting member forming the sides and end portions of said body and of a height sufficient to form an air-inflated body of the desired height, and wherein said interconnecting member has a stiff portion extending along a portion of the length thereof which is movable to and from a substantially vertical position to and from a substantially horizontal position overlying the adjacent portion of said top portion, and wherein said body is provided with a manually-operable air inlet and air outlet valve which is closed following the inflation of said body and which is opened to permit the escape of air from said body when said body is collapsed and deflated, the steps of moving said stiff portion from its substantially vertical position to a substantially horizontal position when said valve is closed to force the air within said body adjacent said stiff portion into the remaining portion of said body to increase the air pressure within said remaining portion, and retaining said stiff portion in its substantially horizontal position when said body is in use as an air-inflated cushion, pillow, mattress or the like.

2. A method of increasing the air pressure within an air-inflated, box-like body as defined in claim 1 wherein said body is of substantially rectangular configuration in plan and stiff portions are provided one at each end of said body which stiff portions are each operable in accordance with the method and for the same purpose set forth in claim 1.

3. A method for increasing the air pressure within an air-inflated, box-like body of the type defined in claim 1, wherein said stiff portion is provided with a one-way check valve in addition to the manually operable air inlet and air outlet valve, which check valve permits air to enter said body but prevents air from escaping therefrom, the step of repeatedly moving said stiff portion from its substantially vertical position to its substantially horizontal position to create a pumping action to increase the air pressure within said body, and when the air pressure therein has been increased to the desired degree may return to and remain in its substantially vertical position.

4. A method for increasing the air pressure within an air-inflated, box-like body of the type defined in claim 3, wherein said stiff portion is moved upon completion of the pumping action into a substantially horizontal position overlying the adjacent portion of the top portion of said body and is retained in said substantially horizontal position when said body is in its inflated condition.

5. A method for increasing the air pressure within an air-inflated, box-like body of the type defined in claim 3, wherein the said inlet, air outlet and one-way check valve are combined in a single valve structure in which the one-way check valve may be manually manipulated to render its one-way function inoperative to permit the escape of air therethrough when the hollow body is being collapsed or deflated.

6. A method for forming an airtight, air-inflated body consisting of a plurality of closely-adjacent, longitudinally-extending tube-like members formed by placing a series of spaced, parallel rows of adhesive along the upper surface of a first sheet of flat, flexible, air-impervious material and superimposing upon said first sheet a second sheet of flat, flexible, air-impervious material of substantially the same size and configuration as said first sheet; forming the material of said first and second sheets into longitudinally-extending bulges of a width greater than the distance between the respective parallel rows of adhesive; securing said bulged sheets together along the spaced, parallel rows of adhesive to form a series of closely-adjacent, open-ended tube-like members of substantially circular transverse cross section, said rows of adhesive and said bulged portions terminating in spaced relation to the adjacent marginal edges of said sheets; securing the marginal edges of said sheets together throughout the length thereof and leaving a hollow space between the ends of said tube-like members and the adjacent edges of said first and second sheets which forms an air space and permits air to be introduced under pressure to the said tube-like members; providing the wall defining at least one of said air spaces with a vertically disposed stiff member having an air inlet and an air outlet passing therethrough, said air inlet being open when air under pressure is forced into said air space to inflate said tube-like members and being closed when said tube-like members have been inflated; moving said stiff member from its said vertical position after the tube-like members have been inflated to a horizontal position overlying the adjacent portions of said tube-like members to force the air from said adjacent portions into the remaining portions of said tube-like members to increase the air pressure therein; and then retaining said stiff member in its said horizontal position.

* * * * *